US012727604B2

(12) United States Patent
Widyaratne et al.

(10) Patent No.: US 12,727,604 B2
(45) Date of Patent: Sep. 8, 2026

(54) PROCESS FOR PREPARING A BEVERAGE ENRICHED WITH NATURAL ANTIOXIDANTS AND BEVERAGE COMPOSITION THEREOF

(71) Applicant: WALTERS BAY HOLDINGS, LLC, Austin, TX (US)

(72) Inventors: Sanjeewa Widyaratne, Austin, TX (US); Angelo Wickramasuriya, Wattala (LK); Thijee Pasan Peththawadu, Piliyandala (LK)

(73) Assignee: WALTERS BAY HOLDINGS, LLC, Austin, TX (US)

( * ) Notice: Subject to any disclaimer, the term of this patent is extended or adjusted under 35 U.S.C. 154(b) by 0 days.

(21) Appl. No.: 18/696,102

(22) PCT Filed: Sep. 28, 2022

(86) PCT No.: PCT/US2022/077153
§ 371 (c)(1),
(2) Date: Mar. 27, 2024

(87) PCT Pub. No.: WO2023/056279
PCT Pub. Date: Apr. 6, 2023

(65) Prior Publication Data
US 2024/0260601 A1 Aug. 8, 2024

Related U.S. Application Data
(60) Provisional application No. 63/249,222, filed on Sep. 28, 2021.

(51) Int. Cl.
*A23F 5/46* (2006.01)
*A23F 3/14* (2006.01)
(Continued)

(52) U.S. Cl.
CPC ................ *A23F 5/465* (2013.01); *A23F 3/14* (2013.01); *A23F 5/24* (2013.01); *A23L 2/382* (2013.01);
(Continued)

(58) Field of Classification Search
CPC .... A23F 5/465; A23F 3/14; A23F 5/24; A23L 2/70
See application file for complete search history.

(56) References Cited

U.S. PATENT DOCUMENTS

2011/0123700 A1* 5/2011 Peththawadu ............ A23F 3/28 426/597
2012/0201931 A1* 8/2012 Addison ................ A23L 2/395 426/72
(Continued)

FOREIGN PATENT DOCUMENTS

BR 102017027112 A2 6/2018
EP 0110391 A1 * 6/1984 ............... A23F 3/18
(Continued)

OTHER PUBLICATIONS https://www.zestaceylontea.com/blog/about-tea/tea-manufacturing-process/ Aug. 17, 2020 "Tea Manufacturing Process" (Year: 2020).*
(Continued)

*Primary Examiner* — Felicia C Turner
(74) *Attorney, Agent, or Firm* — Perilla Knox & Hildebrandt; Kenneth A. Knox

(57) ABSTRACT

The present disclosure generally relates to a process for preparing a beverage enriched with healthy antioxidant and natural caffeine comprises blending combination of selected ingredients with purified water and vegetable glycerin upon stirring the mixture uniformly; performing cold maceration of the mixture at a low temperature for a period of time prior to the start of fermentation; centrifuging the cold macerated
(Continued)

mixture for removing tea/coffee residue from the mixture; concentrating liquid extract of tea/coffee thereby performing secondary clarification for removing left out tea/coffee residue; and concentrating clarified tea/coffee followed by homogenizing the concentrated tea/coffee thereafter filling ready to drink tea/coffee into a jar/packet.

2 Claims, 7 Drawing Sheets

(51) Int. Cl.

| | |
|---|---|
| ***A23F 5/24*** | (2006.01) |
| ***A23L 2/38*** | (2021.01) |
| ***A23L 2/39*** | (2006.01) |
| ***A23L 2/56*** | (2006.01) |
| ***A23L 2/70*** | (2006.01) |

(52) U.S. Cl.
CPC .................................... *A23L 2/39* (2013.01); *A23L 2/56* (2013.01); *A23L 2/70* (2013.01)

(56) References Cited

U.S. PATENT DOCUMENTS

2013/0177672 A1 7/2013 Robinson et al.
2013/0323379 A1 12/2013 Bernal et al.
2017/0071231 A1 3/2017 Johnson et al.
2017/0119006 A1* 5/2017 Ragnarsson ............ A23L 2/385
2017/0273330 A1 9/2017 Napolitano et al.

FOREIGN PATENT DOCUMENTS

GB 2536094 A * 9/2016 ............... A23F 3/00
WO WO-2008112961 A1 * 9/2008 ............. A23L 2/385
WO WO-2009112890 A1 * 9/2009 ............. A23F 3/163

OTHER PUBLICATIONS

Marques BR 201723416 Machine Translation (Year: 2017).*
Xiao et al. CN 105767331 Jul. 2016 Machine Translation (Year: 2016).*
https://web.archive.org/web/20201201154532/https://www.halpetea.com/ceylon-tea-guide.html (Year: 2020).*
Peter D'Amato "Ceylon Coffee" Fresh Cup Magazine Jan. 2, 2016 16 pages (Year: 2016).*
Chung et al. AU 2008242287 Machine Translation (Year: 2008).*
Wang CN 104351405 Feb. 2015 machine Translation (Year: 2015).*
Wang et al. CN 104351405 Machine Translation (Year: 2015).*
Taulbee et al. "Centrifugation" Encyclopedia of Separation Science 2000 pp. 17-40 (Year: 2000).*
International Search Report for International Application No. PCT/US2022/077153.
Written Opinion for International Application No. PCT/US2022/077153.

* cited by examiner

| Tea Coffee Chai Concentrate | % | Coffee Chai Concentrate | % |
|---|---|---|---|
| Vegetable Glycerin | 32 - 38 | Vegetable Glycerin | 32 - 38 |
| Ceylon High Grown Black Tea | 25 - 30 | Ceylon High Grown Black Tea | 5 - 10 |
| Ceylon High Grown Coffee | 18 - 22 | Ceylon High Grown Coffee | 35 - 40 |
| Cloves | 1.5 - 2 | Cloves | 1.5 - 2 |
| | | | |
| | | | |
| | | | |
| Cardamom | 1.5 -2 | Cardamom | 1.5 -2 |
| Cinnamon | 4 - 6 | Cinnamon | 4 - 6 |
| Nutmeg | 1 – 2 | Nutmeg | 1 – 2 |
| Ginger | 4 – 6 | Ginger | 4 – 6 |
| Pepper | 1 - 2 | Pepper | 1 - 2 |
| Vannila | 1.5 – 2 | Vannila | 1.5 – 2 |
| Cocoa Powder | 1 - 2 | Cocoa Powder | 2 - 3 |
| Vitamin C | 2 | Vitamin C | 2 |
| Purified Water | 10 - 20 | Purified Water | 10 - 20 |
| Dilution ratio | 1:15 | Dilution ratio | 1:15 |
| No added flavors 100% Natural | | No added flavors 100% Natural | |

Figure 3

| Coffee Concentrate | % | Green Tea Herbal Concentrate | % |
|---|---|---|---|
| Vegetable Glycerin | 32 - 38 | Vegetable Glycerin | 32 - 38 |
| | | Ceylon High Grown Green Tea | 40 - 45 |
| Ceylon High Grown Coffee | 45 - 55 | | |
| | | | |
| | | Moringa | 10 - 12 |
| | | Lemon Grass | 8 - 10 |
| | | Mint | 4 - 6 |
| | | | |
| | | | |
| | | | |
| | | | |
| | | | |
| Vannila | 3 - 4 | | |
| Cocoa Powder | 5 - 6 | | |
| Vitamin C | 2 | Vitamin C | 2 |
| Purified Water | 10 - 20 | Purified Water | 10 - 20 |
| Dilution ratio | 1:25 | Dilution ratio | 1:25 |
| No added flavors 100% Natural | | No added flavors 100% Natural | |

Figure 4

NUTRITION FACTS

| | |
|---|---|
| Servings per container | 13 |
| **Serving Size** | **15 ml** |
| cup size | 240 ml |
| **Amount per serving** | |
| **Calories** | ---- |
| | **Value per Serving** |
| **Total Fat** | --- |
| Saturated Fat | ---- |
| Cholesterol | ----- |
| **Sodium (mg)** | --- |
| **Total Carbohydrate** | ---- |
| Dietary Fibre | ------ |
| Total Sugar | ------ |
| **Protein (g)** | ------ |
| Vitamin C --- | Calcium ------- |
| Iron ----- | |
| **Volume:** 200 ml | |

Ingredients: Arabica Coffee, Purified Water, Vegetable Glycerin, Vitamin C

NUTRITION FACTS

| | |
|---|---|
| Servings per container | 20 |
| **Serving Size** | **10 ml** |
| cup size | 240 ml |
| **Amount per serving** | |
| **Calories** | **Nil** |
| | **Value per Serving** |
| **Total Fat** | **Nil** |
| Saturated Fat | Nil |
| Cholesterol | Nil |
| **Sodium (mg)** | 4 |
| **Total Carbohydrate** | **Nil** |
| Dietary Fibre | Nil |
| Total Sugar | Nil |
| **Protein (g)** | **0.13** |
| Vitamin C 9 mg | Calcium 0.23 mg |
| Iron 0.1 mg | |
| **Volume:** 200 ml | |

Ingredients: Black Tea, Purified Water, Vegetable Glycerin, Vitamin C

Figure 7

Tea Concentrate Test Results

PURITY TEST

| | |
|---|---|
| Zn | : Not detected |
| Arsenic | : Not detected |
| Led | : Not detected |
| Tin | : Not detected |
| Cadmium | : Not detected |

MICROBIOLOGICAL

| | |
|---|---|
| Viable count | : Not detected |
| Yeast & Mold | : 10 cfu/ml |
| Total Coliforms | : Not detected |
| E-coli | : Not detected |
| Salmonella | : Not detected |
| Shelf life | : 2 Years |

(a)

Black Tea Concentrate Test Results

PURITY TEST

| | |
|---|---|
| Zn | : Not detected |
| Arsenic | : Not detected |
| Led | : Not detected |
| Tin | : Not detected |
| Cadmium | : Not detected |

MICROBIOLOGICAL

| | |
|---|---|
| Viable count | : Not detected |
| Yeast & Mold | : 10 cfu/ml |
| Total Coliforms | : Not detected |
| E-coli | : Not detected |
| Salmonella | : Not detected |
| Shelf life | : 2 Years |

(b)

Green Tea Concentrate Test Results

PURITY TEST

| | |
|---|---|
| Zn | : Not detected |
| Arsenic | : Not detected |
| Led | : Not detected |
| Tin | : Not detected |
| Cadmium | : Not detected |

MICROBIOLOGICAL

| | |
|---|---|
| Viable count | : Not detected |
| Yeast & Mold | : 10 cfu/ml |
| Total Coliforms | : Not detected |
| E-coli | : Not detected |
| Salmonella | : Not detected |
| Shelf life | : 2 Years |

PROCESS FOR PREPARING A BEVERAGE ENRICHED WITH NATURAL ANTIOXIDANTS AND BEVERAGE COMPOSITION THEREOF

CROSS-REFERENCE TO RELATED APPLICATION

This application is a national phase application under 35 U.S.C. § 371 of International Application No. PCT/US2022/077153 filed Sep. 28, 2022 entitled "A PROCESS FOR PREPARING A BEVERAGE ENRICHED WITH NATURAL ANTIOXIDANTS AND BEVERAGE COMPOSITION THEREOF," which claims the benefit of and priority to U.S. Provisional Patent Application No. 63/249,222 filed Sep. 28, 2021, the contents of both of which being incorporated by reference in their entireties herein.

TECHNICAL FIELD

The present disclosure relates to food and beverage sector. More particularly, the present disclosure relates to a process for preparing a beverage enriched with healthy antioxidant and natural caffeine, and a beverage composition thereof.

BACKGROUND

Tea/coffee is a basic need for a large percentage of people in almost every country, and these consumers require tea/coffee almost every day and many of them takes tea/coffee multiple times in a single day.

In the existing processes involving tea leaves, antioxidants and caffeine are not optimized to derive the highest health benefits of a single serving. Further, the existing methodology does not address the optimization of antioxidants or caffeine by mixing and blending various ratios of high antioxidant plants such as black tea, green tea and white tea, mixed together with coffee beans or specific spices or grape skin Resveratrol. In the view of the forgoing discussion, it is clearly portrayed that there is a need to have a process for preparing a beverage enriched with healthy antioxidant and natural caffeine.

BRIEF SUMMARY

The present disclosure seeks to provide a process for preparing a High-Polyphenol and Antioxidant extract using varying ratios of tea leaves, spices, coffee beans and natural glycerin as a substrate or as an agent of extraction of natural antioxidants and natural caffeine. In the present disclosure, natural health and wellness components of plants are extracted at an optimum by blending them in various ratios to maximize final antioxidants and natural caffeine of the extract using natural glycerin.

In the present disclosure, different ratios of natural ingredients are blended and used with a glycerine based extract that increases the final Antioxidant levels and natural caffeine of the extraction exponentially.

In an embodiment, a process for preparing a beverage concentrate enriched with healthy antioxidant and natural caffeine is disclosed. The process includes blending combination of selected ingredients with purified water and vegetable glycerin upon stirring the mixture uniformly. The process further includes performing cold maceration of the mixture at a low temperature for a period of time prior to the start of fermentation. The process further includes centrifuging the cold macerated mixture for removing tea/coffee residue from the mixture. The process further includes concentrating liquid extract of tea/coffee thereby performing secondary clarification for removing left out tea/coffee residue. The process further includes concentrating clarified tea/coffee followed by homogenizing the concentrated tea/coffee thereafter filling ready to drink tea/coffee into a jar/packet.

In another embodiment, the beverage concentrate composition comprises combination of selected ingredients for tea coffee chai concentrate selected from the group of 32-38% of Vegetable Glycerin, 25-30% of Ceylon High Grown Black Tea, 18-22% of Ceylon High Grown Coffee, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 1-2% of Cocoa Powder, 2% of Vitamin C, and 10-20% of Purified Water.

In another embodiment, the beverage concentrate composition comprises combination of selected ingredients for coffee chai concentrate selected from the group of 32-38% of Vegetable Glycerin, 5-10% of Ceylon High Grown Black Tea, 35-40% of Ceylon High Grown Coffee, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 2-3% of Cocoa Powder, 2% of Vitamin C, and 10-20% of Purified Water.

In another embodiment, the beverage concentrate composition comprises combination of selected ingredients for coffee concentrate is selected from the group of 32-38% of Vegetable Glycerin, 45-55% of Ceylon High Grown Coffee, 3-4% of Vanilla, 5-6% of Cocoa Powder, 2% of Vitamin C, and 10-20% of Purified Water.

In another embodiment, the beverage concentrate composition comprises combination of selected ingredients for green tea herbal concentrate is selected from the group of 32-38% of Vegetable Glycerin, 40-45% of Ceylon High Grown Green Tea, 10-12% of Moringa, 8-10% of Lemon Grass, 4-6% of Mint, 2% of Vitamin C, and 10-20% of Purified Water.

In another embodiment, 1:15 dilution ratio is selected for tea coffee chai concentrate and coffee chai concentrate, whereas 1:25 dilution ration is selected for coffee concentrate and green tea herbal concentrate.

In another embodiment, the maceration is performed for 3-4 days at 4-15 degree Celsius temperature.

In another embodiment, cold macerating of pre-blended multi-ingredient mix in natural glycerin is performed at varying temperatures depending on the ingredients mix/ratios.

In another embodiment, centrifugal separation of liquid extract from ingredient and glycerin mix from a crude liquids mix to a filtered residue-free extract is performed by a centrifuge.

In another embodiment, a composition of tea coffee chai concentrate and coffee chai concentrate composition comprises: an aqueous extract of Vegetable Glycerin, from 32-38% v/v; a powder extract of one or more of a black tea/coffee, from 5-40% v/v; a powder extract of Cloves, from 1.5-2% v/v; a powder extract of Cardamom, from 1.5-2% v/v; a powder extract of Cinnamon, from 4-6% v/v; a powder extract of Nutmeg, from 1-2% v/v; a powder extract of Ginger, from 1-2% v/v; a powder extract of Pepper, from 1-2% v/v; a powder extract of Vanilla, from 1.5-2% v/v; a powder extract of Cocoa Powder, from 1-3% v/v; and a powder extract of Vitamin C, from 2% v/v in 10-20% purified water.

In one embodiment, 25-30% of Ceylon High Grown Black Tea, and 18-22% of Ceylon High Grown Coffee is selected for tea coffee chai concentrate, wherein the 5-10% of Ceylon High Grown Black Tea, 35-40% of Ceylon High Grown Coffee is selected for coffee chai concentrate.

In another embodiment, a composition of coffee concentrate and green tea herbal concentrate composition comprises: an aqueous extract of Vegetable Glycerin, from 32-38% v/v; a powder extract of one or more of a green tea/green tea/coffee, from 5-55% v/v; a powder extract of Moringa, from 10-12% v/v; a powder extract of Lemon Grass, from 8-10% v/v; a powder extract of Mint, from 4-6% v/v; a powder extract of Vanilla, from 3-4% v/v; a powder extract of Cocoa Powder, from 5-6% v/v; and a powder extract of Vitamin C, from 2% v/v in 10-20% purified water.

In one embodiment, the beverage concentrate composition comprises combination of selected ingredients for coffee concentrate is selected from the group of 32-38% of Vegetable Glycerin, 45-55% of Ceylon High Grown Coffee, 3-4% of Vanilla, 5-6% of Cocoa Powder, 2% of Vitamin C, and 10-20% of Purified Water, wherein the beverage concentrate composition comprises combination of selected ingredients for green tea herbal concentrate is selected from the group of 32-38% of Vegetable Glycerin, 40-45% of Ceylon High Grown Green Tea, 10-12% of Moringa, 8-10% of Lemon Grass, 4-6% of Mint, 2% of Vitamin C, and 10-20% of Purified Water.

An object of the present disclosure is to offer the highest levels of plant-based antioxidants and natural caffeine as a highly concentrated extract.

Another object of the present disclosure is to overcome a manufacturing hurdle that many extractions companies experience.

Yet another object of the present disclosure is to deliver an expeditious and cost-effective process to develop a highly concentrated, multi-ingredient, plant-based extraction using natural glycerin to optimize natural antioxidants and natural caffeine.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein:

FIG. 3 illustrates Table 1 depicts tea coffee chai concentrate and coffee chai concentrate ingredients in accordance with an embodiment of the present disclosure;

FIG. 4 illustrates Table 2 depicts coffee concentrate and green tea herbal concentrate ingredients in accordance with an embodiment of the present disclosure;

FIG. 7 illustrates nutritional facts in accordance with an embodiment of the present disclosure; and FIG. 8 (*a-c*) illustrate the test results of tea, black tea, green tea concentrates of the present disclosure.

Figure 1:
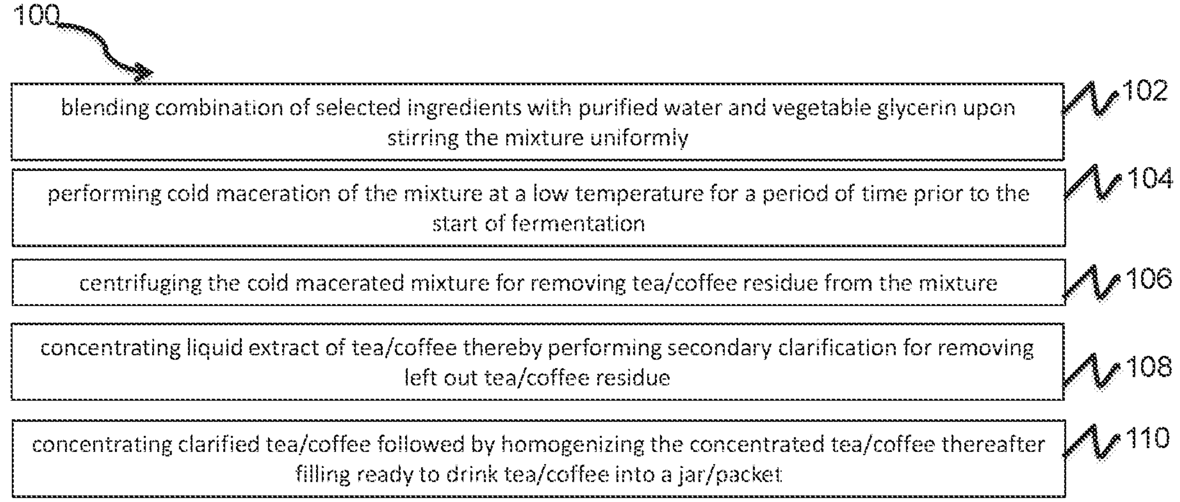
FIG. 1 illustrates a flow chart of a process for preparing a beverage enriched with healthy antioxidant and natural caffeine in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated disclosure, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method.

Unless otherwise defined, all technical and scientific terms used herein have the same meaning as commonly understood by one of ordinary skill in the art to which this disclosure belongs. The methods, and examples provided herein are illustrative only and not intended to be limiting.

Embodiments of the present disclosure will be described below in detail with reference to the accompanying drawings.

Referring to FIG. 1, a flow chart of a process for preparing a beverage enriched with healthy antioxidant and natural caffeine is illustrated in accordance with an embodiment of the present disclosure. At step 102, the process 100 includes blending combination of selected ingredients with purified water and vegetable glycerin upon stirring the mixture uniformly. Continuous stirring and mixing of combination of selected ingredients are performed to avoid coagulation of the combination of selected ingredients.

At step 104, the process 100 includes performing cold maceration of the mixture at a low temperature for a period of time prior to the start of fermentation.

At step 106, the process 100 includes centrifuging the cold macerated mixture for removing tea/coffee residue from the mixture. The cold maceration is performed for 3-4 days at 4-15 degree Celsius temperature.

At step 108, the process 100 includes concentrating liquid extract of tea/coffee thereby performing secondary clarification for removing left out tea/coffee residue to obtain residue free liquid extract.

At step 110, the process 100 includes concentrating clarified tea/coffee followed by homogenizing the residue free liquid extract thereafter filling ready to drink tea/coffee into a jar/packet.

In another embodiment, the combination of selected ingredients is selected from a group of 32-38% of Vegetable Glycerin, 25-30% of Ceylon High Grown Black Tea, 18-22% of Ceylon High Grown Coffee, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 1-2% of Cocoa Powder, 2% of Vitamin C, and 10-20% of Purified Water.

In another embodiment, the combination of selected ingredients is selected from a group of 32-38% of Vegetable Glycerin, 5-10% of Ceylon High Grown Black Tea, 35-40% of Ceylon High Grown Coffee, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 2-3% of Cocoa Powder, 2% of Vitamin C, and 10-20% of Purified Water. The ingredients for tea coffee chai and coffee chai concentrate is illustrated in FIG. 3 as an exemplary implementation.

In another embodiment, the combination of selected ingredients is selected from a group of 32-38% of Vegetable Glycerin, 45-55% of Ceylon High Grown Coffee, 3-4% of Vanilla, 5-6% of Cocoa Powder, 2% of Vitamin C, and 10-20% of Purified Water.

In another embodiment, the combination of selected ingredients is selected from a group of 32-38% of Vegetable Glycerin, 40-45% of Ceylon High Grown Green Tea, 10-12% of Moringa, 8-10% of Lemon Grass, 4-6% of Mint, 2% of Vitamin C, and 10-20% of Purified Water. The ingredients for coffee concentrate and green tea herbal concentrate are illustrated in FIG. 4 as an exemplary implementation.

In an embodiment, the tea includes green tea, black tea, Ceylon High Grown Black Tea, Ceylon High Grown Green Black Tea.

In an embodiment, the coffee incudes Ceylon High Grown Coffee.

In another embodiment, 1:15 dilution ratio is selected for tea coffee concentrate and coffee concentrate, whereas 1:25 dilution ration is selected for coffee concentrate and green tea herbal concentrate.

In another embodiment, cold macerating of pre-blended multi-ingredient mix in natural glycerin is performed at varying temperatures depending on the ingredients mix/ratios.

In another embodiment, centrifugal separation of liquid extract from ingredient and glycerin mix from a crude liquids mix to a filtered residue-free extract is performed by a centrifuge.

In another embodiment, a beverage concentrate composition comprises an aqueous extract of Vegetable Glycerin, from 32-38% v/v; a powder extract of one or more of a black tea/coffee, from 5-40% v/v; a powder extract of Cloves, from 1.5-2% v/v; a powder extract of Cardamom, from 1.5-2% v/v; a powder extract of Cinnamon, from 4-6% v/v; a powder extract of Nutmeg, from 1-2% v/v; a powder extract of Ginger, from 1-2% v/v; a powder extract of Pepper, from 1-2% v/v; a powder extract of Vanilla, from 1.5-2% v/v; a powder extract of Cocoa Powder, from 1-3% v/v; a powder extract of Vitamin C, from 2% v/v; and 10-20% purified water.

In one embodiment, the powder extract of one or more of tea, coffee comprises 25-30% of Ceylon High Grown Black Tea, preferably, 5-30% of Ceylon High Grown Black Tea.

In one embodiment, the powder extract of one or more of tea, coffee comprises 18-40% of Ceylon High Grown Coffee, and preferably, 18-22% of Ceylon High Grown Coffee.

In one embodiment, the powder extract of one or more of tea, coffee comprises 5-10% of Ceylon High Grown Black Tea, 35-40% of Ceylon High Grown Coffee is selected for coffee chai concentrate.

In another embodiment, a beverage concentrate composition comprising: an aqueous extract of Vegetable Glycerin, from 32-38% v/v; a powder extract of one or more of a green tea/green tea/coffee, from 5-55% v/v; a powder extract of Moringa, from 10-12% v/v; a powder extract of Lemon Grass, from 8-10% v/v; a powder extract of Mint, from 4-6% v/v; a powder extract of Vanilla, from 3-4% v/v; a powder extract of Cocoa Powder, from 5-6% v/v; a powder extract of Vitamin C, from 2% v/v, and 10-20% purified water.

In one embodiment, a beverage concentrate composition comprises combination of selected ingredients for coffee concentrate is selected from the group of 32-38% of Vegetable Glycerin, 45-55% of Ceylon High Grown Coffee, 3-4% of Vanilla, 5-6% of Cocoa Powder, 2% of Vitamin C, and 10-20% of Purified Water, wherein the beverage concentrate composition comprises combination of selected ingredients for green tea herbal concentrate is selected from the group of 32-38% of Vegetable Glycerin, 40-45% of Ceylon High Grown Green Tea, 10-12% of Moringa, 8-10% of Lemon Grass, 4-6% of Mint, 2% of Vitamin C, and 10-20% of Purified Water.

In one embodiment, the powder extract of a powder extract of one or more of green tea, coffee comprises 45-55% of Ceylon High Grown Coffee.

In one embodiment, the powder extract of one or more of green tea, coffee comprises 40-45% of Ceylon High Grown Green Tea.

Figure 2:
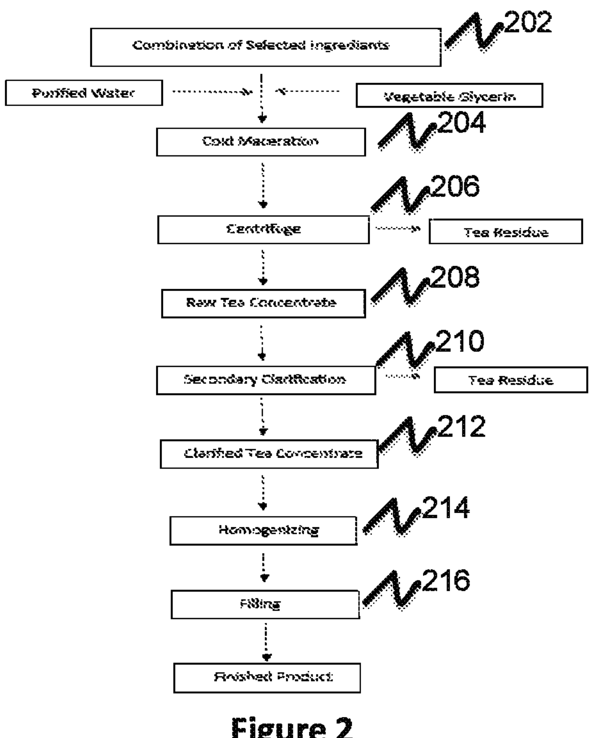
FIG. 2 illustrates a process flow chart for tea concentrate in accordance with an embodiment of the present disclosure.

FIG. 2 illustrates a process flow chart for tea concentrate in accordance with an embodiment of the present disclosure. At step 202, the process 200 includes blending combination of selected ingredients with purified water and vegetable glycerin upon stirring the mixture uniformly.

At step 204, the process 200 includes macerating pre-blended multi-ingredient mix in natural glycerin at varying temperatures depending on the ingredients mix/ratios.

At step 206, the process 200 includes centrifuging separation of liquid extract from ingredient and glycerin mix from a crude liquids mix to a filtered residue-free extract. The cold macerated mixture is centrifuged for removing tea residue from the mixture.

At step 208, the process 200 includes concentrating raw tea. At step 210, the process 200 includes performing secondary clarification for removing left out tea residue.

At step 212, the process 200 includes concentrating clarified tea. At step 214, the process 200 includes homogenizing the concentrated tea. At step 216, the process 200 includes filling ready to drink tea/coffee into a jar/packet.

The goal of the process is to offer the highest levels of plant-based antioxidants and natural caffeine as a highly concentrated extract. Advantage over existing method of glycerin based extraction is the single-ingredient limitations of reduced antioxidants and reduced caffeine per serving.

The process overcomes a manufacturing hurdle that many extraction companies experience. In particularly, the present disclosure optimizes and substantiates antioxidants per serving. The process addresses these with a unique combination and ratios of multiple plants that inherently have natural antioxidants and/or natural caffeine by using glycerin, the extraction of multi-plant or multi-ingredient antioxidants or natural caffeine, if and when present are achieved at the highest possible levels.

Furthermore, additional flavor enhancements and other natural infusion of health and wellness ingredients are added to the glycerin extract to create a unique extract that is vastly different from single-ingredient glycerin extraction such as just with tea leaves.

Other than natural glycerin as an extraction agent, water and other chemical extraction processes are used in many industries. However, it substantially limits the level of antioxidants and caffeine in the extraction. Furthermore, these extractions are limited to mostly single-ingredients and not multiple blends and ratios of various high antioxidant plants.

FIG. 3 illustrates Table 1 depicts tea coffee chai concentrate and coffee chai concentrate ingredients in accordance with an embodiment of the present disclosure.

FIG. 4 illustrates Table 2 depicts coffee concentrate and green tea herbal concentrate ingredients in accordance with an embodiment of the present disclosure.

Figures 5, 6:
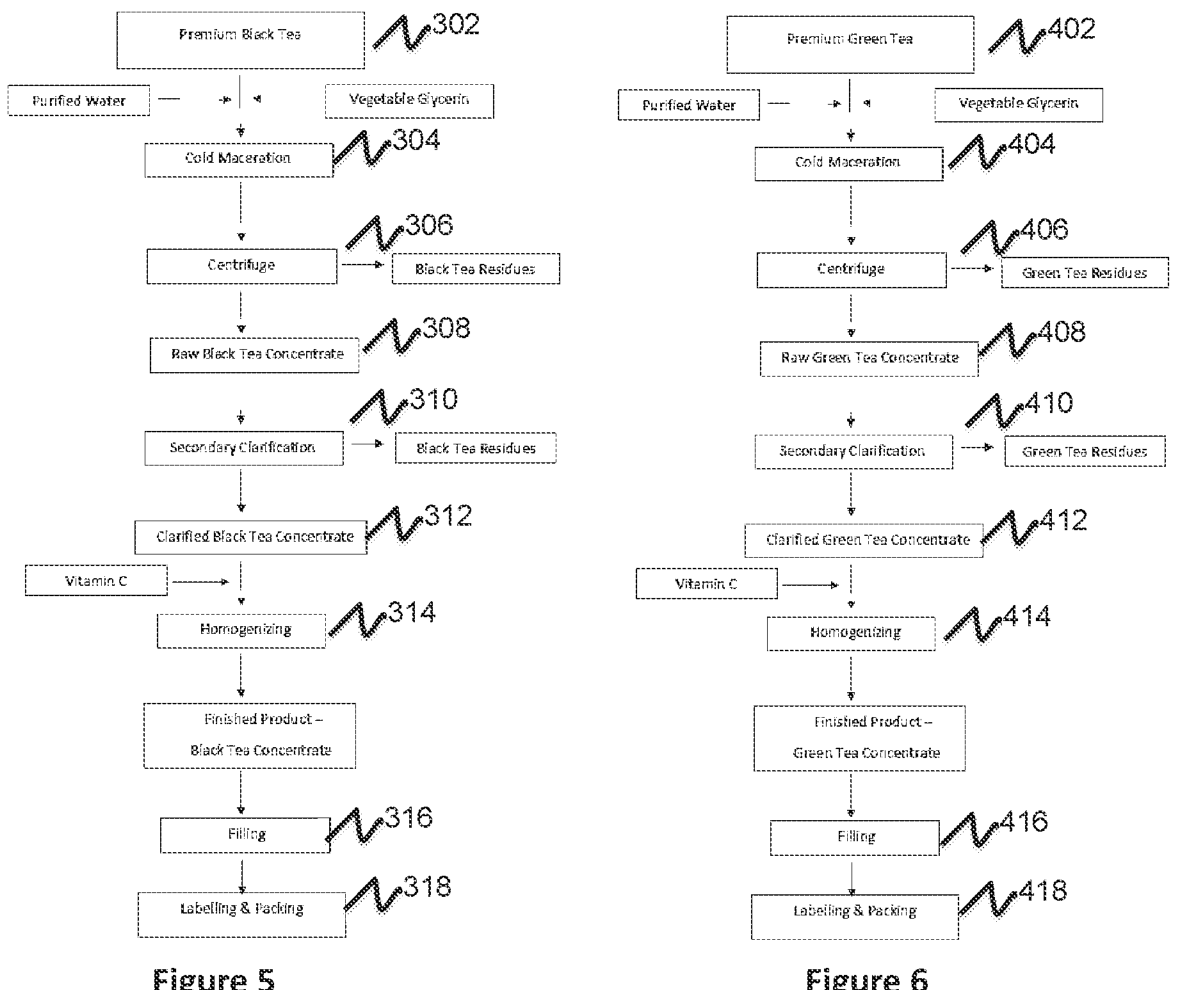
FIG. 5 illustrates a process flow chart for black tea concentrate in accordance with an embodiment of the present disclosure.
FIG. 6 illustrates a process flow chart for green tea concentrate in accordance with an embodiment of the present disclosure.

FIG. 5 illustrates a process flow chart for black tea concentrate in accordance with an embodiment of the present disclosure. At step 302, the process 300 includes blending black tea with purified water and vegetable glycerin upon stirring the mixture uniformly.

At step 304, the process 300 includes macerating pre-blended multi-ingredient mix in natural glycerin at varying temperatures depending on the ingredients mix/ratios.

At step 306, the process 300 includes centrifuging separation of liquid extract from ingredient and glycerin mix from a crude liquids mix to a filtered residue-free extract.

At step 308, the process 300 includes concentrating raw tea.

At step 310, the process 300 includes performing secondary clarification for removing left out black tea residue.

At step 312, the process 300 includes concentrating clarified tea.

At step 314, the process 300 includes homogenizing the concentrated tea.

At step 316, the process 300 includes filling ready to drink finished black tea concentrate.

At step 318, the process 300 includes labeling and packing the filled packed.

FIG. 6 illustrates a process flow chart for green tea concentrate in accordance with an embodiment of the present disclosure. At step 402, the process 400 includes blending green tea with purified water and vegetable glycerin upon stirring the mixture uniformly.

At step 404, the process 400 includes macerating pre-blended multi-ingredient mix in natural glycerin at varying temperatures depending on the ingredients mix/ratios.

At step 406, the process 400 includes centrifuging separation of liquid extract from ingredient and glycerin mix from a crude liquids mix to a filtered residue-free extract.

At step 408, the process 400 includes concentrating raw tea.

At step 410, the process 400 includes performing secondary clarification for removing left out green tea residue.

At step 412, the process 400 includes concentrating clarified tea.

At step 414, the process 400 includes homogenizing the concentrated tea.

At step 416, the process 400 includes filling ready to drink finished black tea concentrate.

At step 418, the process 400 includes labeling and packing the filled packed.

FIG. 7 illustrates nutritional facts in accordance with an embodiment of the present disclosure. Attributes of cold brewed concentrated instant teas, coffees & chai teas are complimented with the both hot and cold water solubility and its extra-ordinary strength.

Due to native cells of tea, coffee or spices are subjected to cold brewing method associated with unlocking, uncapping of whole cells of raw materials, consumers are enable to enjoy fully enriched quality of teas, coffee or chai teas.

Hence, the naturally enriched strong concentrates persist a high dilution ratio than that of the existing products. Few, but not limited to, advantages, of the present disclosure are listed below:

1 Hot & cold water soluble
2. Extractable derivatives are not subjected to heat stress which other extracts do, and those intact due to cold maceration. Thereby, the heat sensitive compounds do not get damaged.
3. Aroma retains
4. User friendly
5. All the concentrates indicate a low glycemic index of 3, significantly lower than sugar, which is at 65.
6. Hassle free quick preparation The dilution ratio of the existing solutions are on a low side concentrated range with 1:12 dilution ratio, against the present disclosure concentrates which have more than two and half times stronger 1:30 dilution ratio and are also much cost effective.

FIG. 8 (*a-c*) illustrate the test results of tea, black tea, green tea concentrates of the present disclosure. It can be seen that from the purity tests that Zinc, Arsenic. Lead, Tin, and Cadmium are not present in the concentrates. The shelf life is about 2 years. Furthermore, the viable counts, Coliforms, *E. Coli, Salmonella* have not been detected. The yeast and mold count was found to be 10 cfu/ml.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

The invention claimed is:

1. A process for preparing a beverage concentrate enriched with natural antioxidants, the process comprising:

blending a combination of selected ingredients to form a mixture under uniform stirring, wherein the combination of selected ingredients consists of 32-38% of Vegetable Glycerin, 5-30% of Ceylon High Grown Black Tea extract, 18-22% of Ceylon High Grown Coffee extract, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 1-2% of Cocoa Powder, 2% of Vitamin C and Purified Water, wherein the ingredients are present in amounts selected from the recited ranges, and the Purified Water is present in an amount sufficient such that the total composition equals 100%;

wherein the Ceylon high-grown black tea extract is obtained by combining part black tea with 15 parts water (w/v), and the Ceylon high-grown coffee extract is obtained by combining 1 part coffee with 15 parts water (w/v);

performing a cold maceration of the mixture at 4-15 degree Celsius temperature for 3-4 days;

centrifuging the mixture obtained after the cold maceration for removing the Ceylon High Grown Black tea and the Ceylon High Grown coffee residue from the mixture, thereby obtaining a liquid extract, wherein the mixture is continuously stirred and mixed to avoid coagulation of the selected ingredients during centrifugation;

concentrating the liquid extract obtained after centrifugation and removing remaining Ceylon High Grown Black Tea residue and Ceylon High Grown Coffee residue from the liquid extract to obtain a residue free liquid extract; and homogenizing the residue free liquid extract to obtain the beverage concentrate.

2. A beverage concentrate composition formed using the process according to claim 1, consisting of:

32-38% of Vegetable Glycerin, 5-30% of Ceylon High Grown Black Tea extract, 18-22% of Ceylon High Grown Coffee extract, 1.5-2% of Cloves, 1.5-2% of Cardamom, 4-6% of Cinnamon, 1-2% of Nutmeg, 4-6% of Ginger, 1-2% of Pepper, 1.5-2% of Vanilla, 1-2% of Cocoa Powder, 2% of Vitamin C and Purified Water, wherein the ingredients are present in amounts selected from the recited ranges, and the Purified Water is present in an amount sufficient such that the total composition equals 100%, wherein the Ceylon High-Grown Black Tea extract corresponds to an aqueous extract obtained from 1 part black tea and 15 parts water (w/v), and the Ceylon High-Grown Coffee extract corresponds to an aqueous extract obtained from 1 part coffee and 15 parts water (w/v).

* * * * *